United States Patent [19]

Manfroni

[11] 4,183,680
[45] Jan. 15, 1980

[54] SCRAPER AND MIXER ELEMENT FOR ICE CREAM MAKING MACHINES

[75] Inventor: Ezio Manfroni, Sasso Marconi, Italy

[73] Assignee: Carpigiani Bruto Macchine Automatiche S.P.A., Anzola Emilia, Italy

[21] Appl. No.: 926,637

[22] Filed: Jul. 21, 1978

[30] Foreign Application Priority Data

Jul. 27, 1977 [IT] Italy ............................. 15193/77[U]

[51] Int. Cl.² ............................................. B01F 7/20
[52] U.S. Cl. ..................................... 366/312; 62/354
[58] Field of Search ............... 366/309, 311, 312, 313; 62/354; 165/94

[56] References Cited

U.S. PATENT DOCUMENTS

| | | | |
|---|---|---|---|
| 1,420,210 | 6/1922 | Paulus | 165/94 |
| 2,506,101 | 5/1950 | Oltz | 366/309 |

FOREIGN PATENT DOCUMENTS

7403192  1/1974  France .

*Primary Examiner*—Robert W. Jenkins
*Attorney, Agent, or Firm*—Larson, Taylor and Hinds

[57] ABSTRACT

The mixer shaft is provided with radial arms supporting the ends of a set of scraping blades into scraping engagement with the wall of the freezing barrel. The ends of the scraping blades are fastened to supporting plates which in turn are secured to the supporting arms in a radially adjustable manner.

4 Claims, 7 Drawing Figures

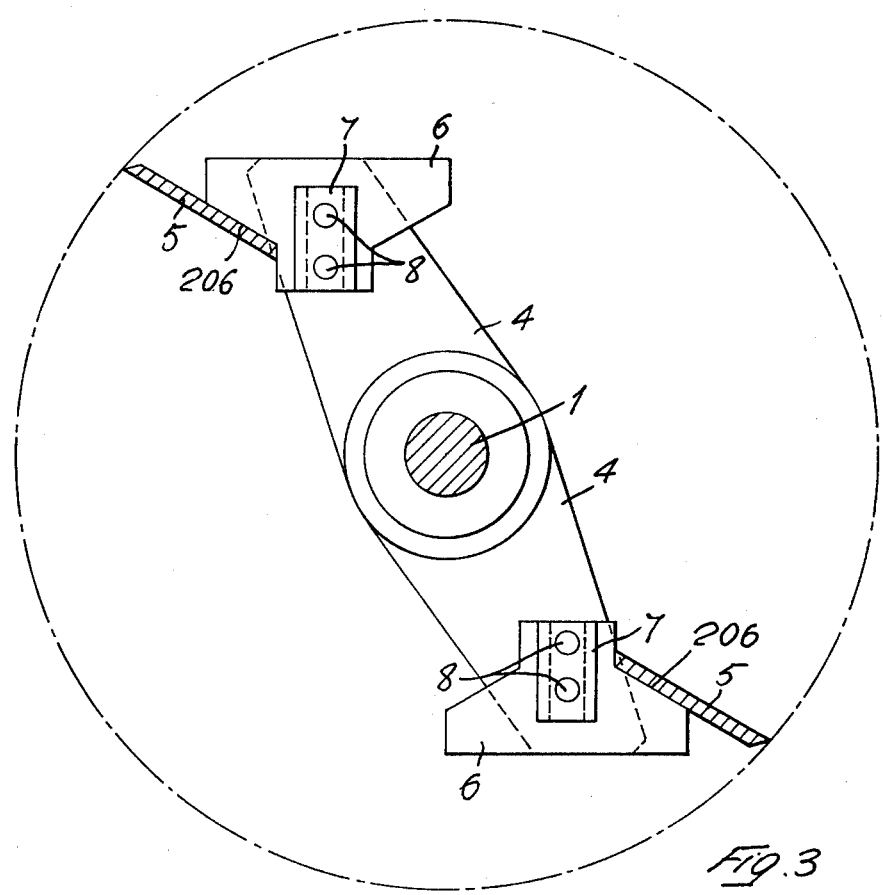
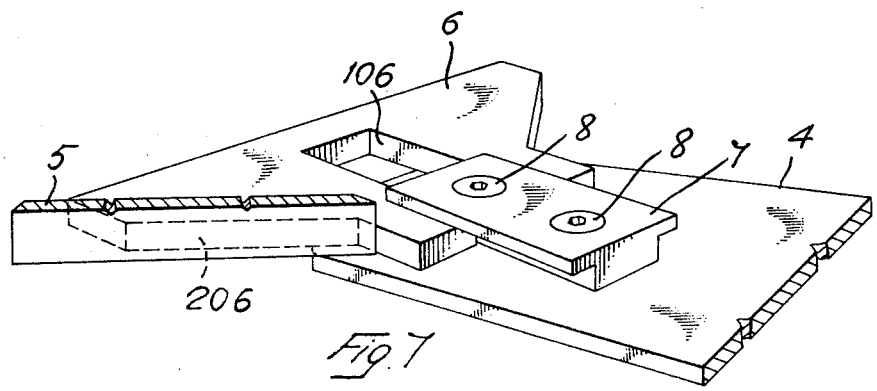

SCRAPER AND MIXER ELEMENT FOR ICE CREAM MAKING MACHINES

FIELD OF THE INVENTION

The present invention relates generally to ice cream making machines of the type comprising a freezing barrel provided with a rotating scraper and mixer element formed by two or more scraping and mixing blades mounted on the ends of radial arms or spokes supported by a motor driven shaft axially extending inside of the freezing barrel of the ice cream machine, with the said scraping and mixing blades into scraping engagement with the wall of the freezing barrel.

STATEMENT OF THE PRIOR ART KNOWN TO THE APPLICANT.

The following prior art is known to the applicant: French Publication of Patent Application No. 74.03192: the whole document.

BACKGROUND AND SUMMARY OF THE INVENTION

One of the problems of the ice cream making machines of the above referred kind is that the blades and/or the wall of the freezing barrel are subjected to progressive wear, whereby the mixer must be either replaced or submitted to a difficult and expensive recharging process to restore the original working conditions.

The present invention aims to obviate to the above and other disadvantages of the known prior art machines of the kind to which the invention refers.

According to one object of the present invention, the scraping blades of the mixer element may be individually, easily and quickly adjusted with respect to the wall of the surrounding freezing barrel.

According to another object of the invention, at least two supporting arms for the scraping blades are provided at the ends thereof with sliding shoes made of relatively soft material, slidingly engaging the wall of the freezing barrel, so as to reduce and control the wear of the scraping blades and at the same time to enable an exact adjustment thereof with respect of the wall of the freezing barrel.

BRIEF DESCRIPTION OF THE DRAWINGS

Other characteristics and advantages of the mixer according to the invention will become apparent from the following detailed description of one preferred embodiment thereof, made with reference to the accompanying drawings wherein:

FIG. 3 is a rear end view of the mixer of FIG. 1.

FIG. 7 is a perspective view in enlarged scale of one end of one of the blade supporting arms, and of the cooperating end of the blade support plate of the mixer of FIGS. 1 to 3.

DESCRIPTION OF THE PREFERRED EMBODIMENT OF THE INVENTION

Figure 1:
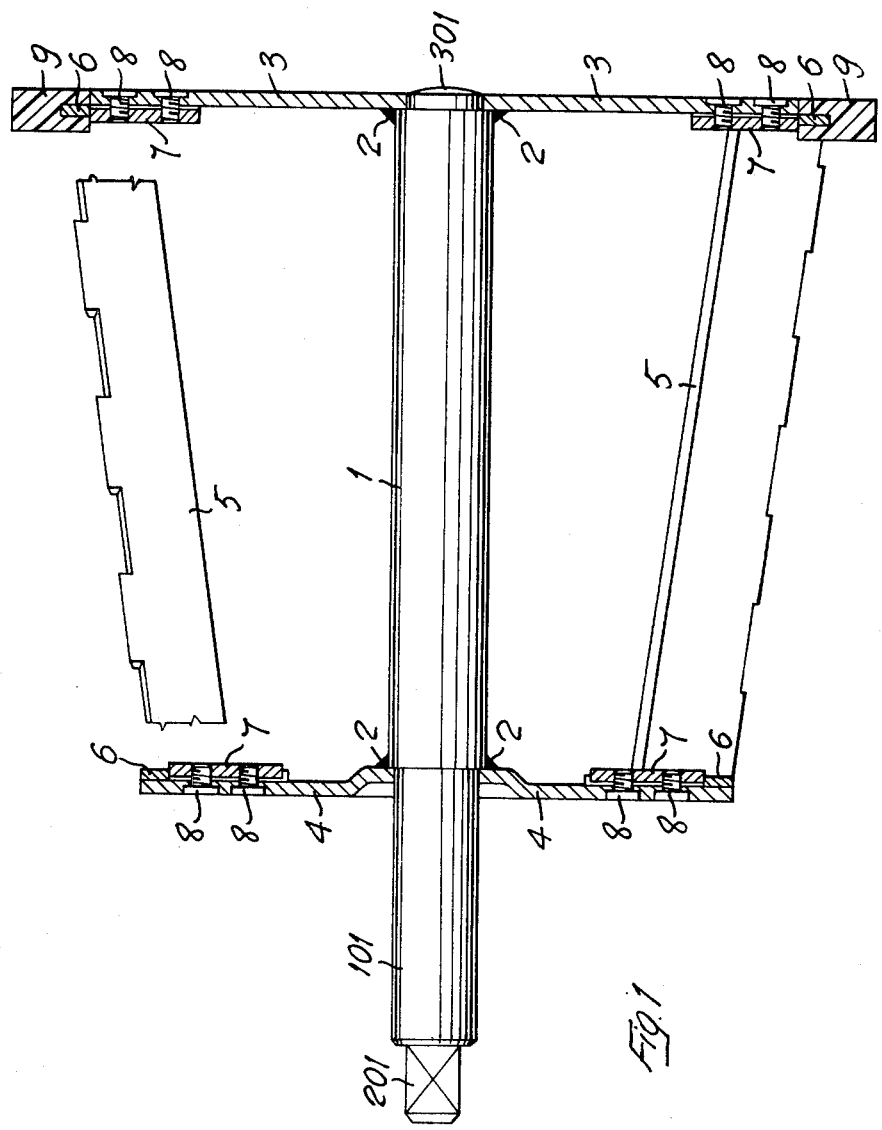
FIG. 1 is a partially sectioned side view of a mixer provided with two diametrically opposed scraping blades according to the invention.
Figure 2:
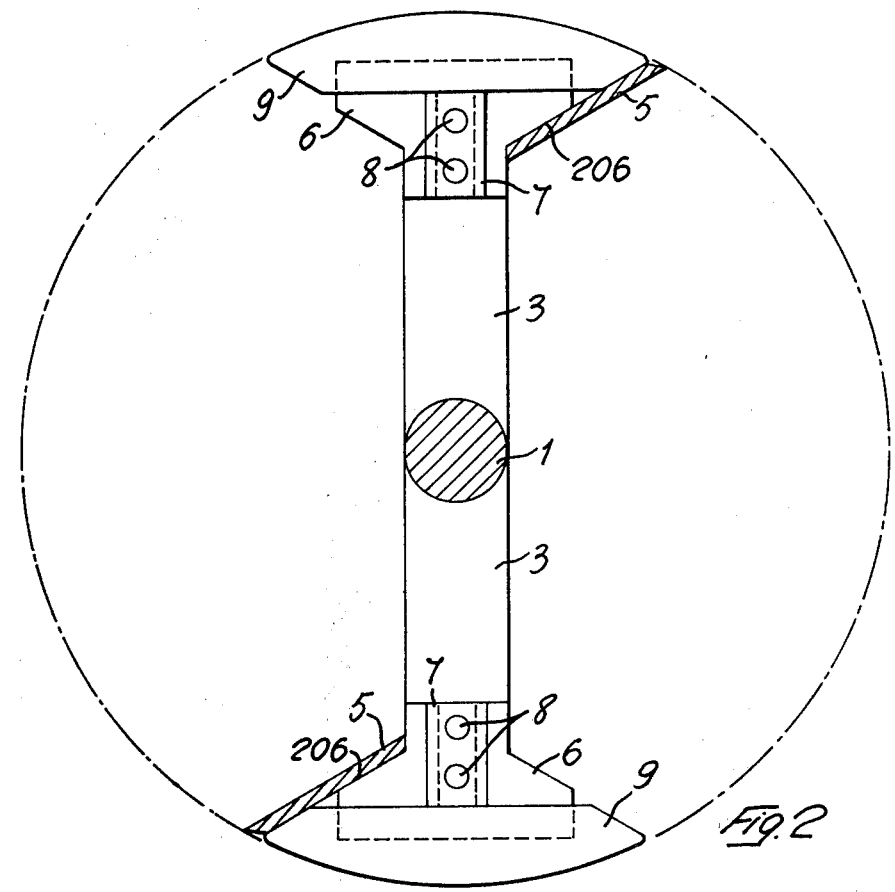
FIG. 2 is a front end view of the mixer of FIG. 1.

With reference to the drawings, the mixer shown comprises a shaft 1 having at one end an extension 101 with a square-shaped terminal projection 201 for engagement with a correspondingly-shaped recess in the drive pinion (not shown). The opposite end of the shaft 1 is provided with a button 301 of suitable antifriction material, for example of plastics material, which will abut against the underface of the cover (not shown) for the freezing barrel of the ice cream making machine.

Radial arms or spokes 3 and 4 are fixed to shaft 1, for example by welding at 2. In the illustrated embodiment, the arms are in the number of two and are diametrically opposite one another, but obviously the arms can be in the number of three and spaced 120° one another, or in any other number.

Moreover, the couples of arms 3 and 4 are angularly staggered one another on shaft 1.

The scraper and mixer blades are shown at 5. Each blade 5 is secured at each end thereof to a supporting plate 6, best shown in FIG. 7. Each supporting plate 6 is substantially of "T"-shape, the two sides 206 of the arms of the "T" being jointed to the stem at an angle corresponding to the angle of the blades 5. The stem of the "T" is provided with a longitudinal recess or cutout 106. The ends of the blades 5 are fixed, for example by welding, to the sides 206 of two supporting plates 6. At the ends of the arms 3 and 4, on the surfaces thereof facing inside the mixer, suitable guiding the locking T-shaped block 7 are releasably secured, as by socket screws 8. The supporting members 6 for said blades 5 will be inserted, by virtue of cutouts 106, between the wings of said blocks and the co-operating surface of arms 3 and 4, respectively, said supporting members being then locked in place by tightening the screws 8.

Said supporting plates 6 are provided with a sector-shaped slide member 9 that is snap-engaged on the head of said member 6. The slide members 9 have the same radius as the co-operating wall of the freezing barrel and are advantageously made of suitable plastics material.

OPERATION OF THE DESCRIBED DEVICE

The operation of the mixer illustrated above is now apparent.

Figure 4:
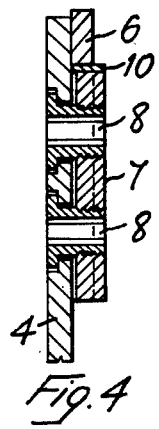
FIGS. 4, 5 and 6 are cross sectional views in enlarged scale of some details of the mixer blade ends and the supporting arms of the mixer element shown in FIGS. 1 to 3.
Figure 5:
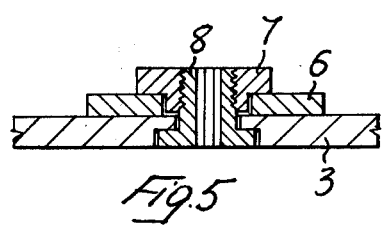
Figure 6:
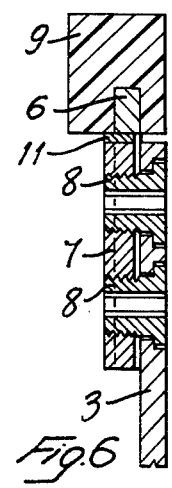

If, after a period of operation, the blades 5 should be adjusted again with respect to the freezing barrel (not shown), due to some wear of these co-operating parts, the adjustment can be made easily by loosening the screws 8, moving the blades 5 and their supports 6 to the required extent, and inserting appropriate shims 10, 11 between the bottom of said cutout 106 and the locking block 7, as shown in FIGS. 4 and 6, respectively.

Once the shim-adjustment has been made and the screws 8 have been tightened again, said shims 10, 11 will obviously be removed.

I claim:

1. In an ice cream making machine of the type comprising a cylindrical freezing barrel, a rotating scraper and mixer element formed by at least two scraping and mixing blades, each endwise secured to a pair of radial arms extending from a motor driven shaft rotatably supported axially inside of the said freezing barrel, with the said scraping the mixing blades into scraping engagement with the wall of the freezing barrel, the improvement according to which each scraping blade is fastened at both ends to a supporting plate, the said plates being secured to said radial arms in a radially adjustable manner said radial arms being provided at their ends with clamping means for firmly clamping said blade supporting plates at any adjusted position, and said clamping means comprising a substantially T shaped guiding block and screw means for tightly securing said guide block against the cooperating surface of the said radial arms; the said blade supporting plates being provided with longitudinal extensions inserted between the wings of the said guide block and the underlying surface of the said radial arms, so that by tightening the said screw means the said blade supporting plates are firmly clamped against the said radial arms.

2. An ice cream making machine according to claim 1, in which at least two of the said blade supporting plates are provided at their radially outwardly directed ends with a sliding shoe into sliding engagement with the inner mantle of the freezing barrel.

3. A machine according to claim 2, wherein the said sliding shoes have a circular sector contour of the same radius as the inner mantle of the freezing barrel.

4. A machine according to claim 2, in which the said shoes are made of antifriction material.

* * * * *